(12) United States Patent
Shibata et al.

(10) Patent No.: US 7,048,661 B2
(45) Date of Patent: May 23, 2006

(54) POWER TRANSMISSION DEVICE AND TORQUE TRANSMISSION MEMBER

(75) Inventors: Haruhisa Shibata, Okazaki (JP); Kazuo Kato, Nagoya (JP); Junichi Ohguchi, Toyoake (JP); Yasuo Tabuchi, Toyoake (JP); Makoto Ito, Okazaki (JP); Toshio Shimomura, Nukata-gun (JP)

(73) Assignee: Denso Corporation, Kariya (JP)

( * ) Notice: Subject to any disclaimer, the term of this patent is extended or adjusted under 35 U.S.C. 154(b) by 113 days.

(21) Appl. No.: 10/637,645

(22) Filed: Aug. 11, 2003

(65) Prior Publication Data
US 2004/0067807 A1 Apr. 8, 2004

(30) Foreign Application Priority Data
Aug. 23, 2002 (JP) ............................. 2002-243795

(51) Int. Cl.
F16D 3/12 (2006.01)
F16F 15/10 (2006.01)

(52) U.S. Cl. ..................... 474/94; 474/70; 74/574.4; 464/73; 464/74

(58) Field of Classification Search .................. 474/70, 474/94; 464/30, 34, 75–76, 45, 83, 89; 192/200, 192/209, 84.96; 428/319.3, 213, 317.1; 74/574.3, 74/574.4, 573 R, 572
See application file for complete search history.

(56) References Cited

U.S. PATENT DOCUMENTS 5,128,196 A * 7/1992 Luetkens et al. ........... 428/213
5,301,073 A * 4/1994 Katohno et al. ............ 464/30
5,601,176 A * 2/1997 Ishimaru et al. ............ 192/200
5,697,261 A * 12/1997 Mokdad et al. ............ 74/573 R
6,045,448 A * 4/2000 Kern et al. .................. 464/74
6,200,221 B1 * 3/2001 Maejima et al. ............ 464/45
6,705,181 B1 * 3/2004 Tabuchi et al. ............. 464/76
6,722,993 B1 * 4/2004 Tabuchi et al. ............. 464/34
6,770,592 B1 * 8/2004 Suzuki et al. ............... 503/201

FOREIGN PATENT DOCUMENTS

| EP | 1380764 A2 | * | 1/2004 |
| JP | 05-305973 A | * | 11/1993 |
| JP | A-8-4761 | | 1/1996 |
| JP | 08-121362 A | * | 5/1996 |
| JP | 09-42411 A | * | 2/1997 |
| JP | A-2001-90812 | | 4/2001 |
| JP | 2002-227880 A | * | 8/2002 |

* cited by examiner

*Primary Examiner*—Marcus Charles
(74) *Attorney, Agent, or Firm*—Posz Law Group, PLC

(57) ABSTRACT

A power transmission device for transmitting torque of a driving unit to a driven unit includes a first rotator, a second rotator, and a torque transmission member. The first rotator is to be driven for rotation by the driving unit. The second rotator is coupled to the driven unit. The torque transmission member is made of an elastically deformable material for making contact with the first rotator and the second rotator to transmit torque from the first rotator to the second rotator. An outer periphery of the torque transmission member includes a contact surface for making contact with the rotators and a non-contact surface out of contact with the rotators. The non-contact surface is provided with an oxygen permeance suppression layer made of a material having an oxygen permeability that is less than that of the contact surface.

9 Claims, 5 Drawing Sheets

FIG. 1A
FIG. 1B
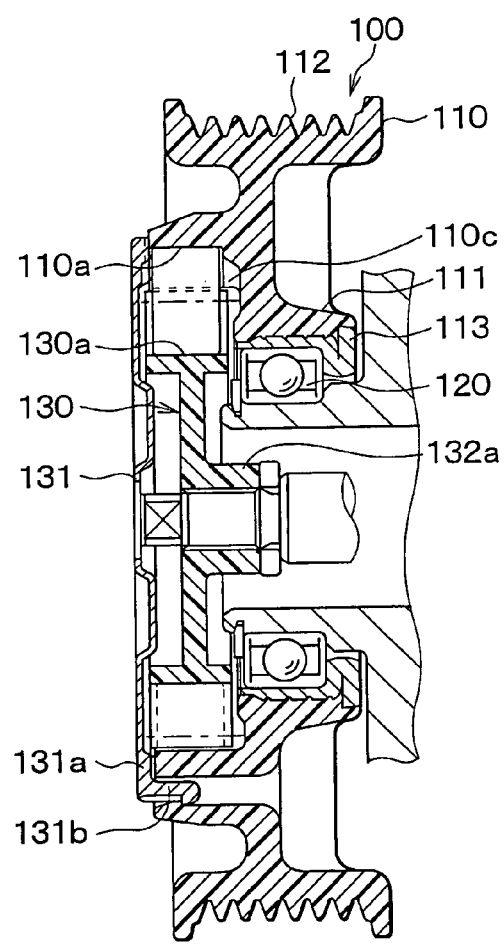
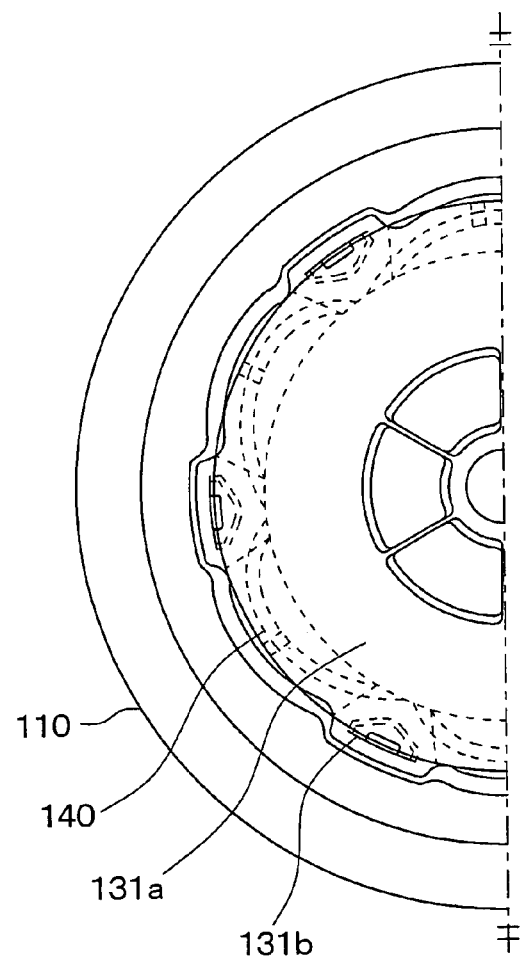

APPLICATION OF FORCE

APPLICATION OF FORCE

POWER TRANSMISSION DEVICE AND TORQUE TRANSMISSION MEMBER

CROSS REFERENCE TO RELATED APPLICATION

This application is based upon, claims the benefit of priority of, and incorporates by reference, the contents of Japanese Patent Application No. 2002-243795 filed Aug. 23, 2002.

BACKGROUND OF THE INVENTION

1. Field of the Invention

The present invention relates to a power transmission device for transmitting torque of a driving unit such as an engine and an electric motor to a driven unit such as a pump and a compressor. More specifically, the device is useful for transmitting engine power to the compressor of a vehicle air conditioner.

2. Description of the Related Art

FIG. 2 shows a power transmission prototype device made by the inventors. This prototype was subjected to an endurance test under a high load condition, the result being the breaking of the rubber dampers 140, or torque transmission members. Then, research on the cause of the damper breakage was made to show that when the foregoing prototype is transmitting torque, the dampers undergo a deforming force. Then, due to the action of heat generation resulting from viscous resistance at the time of the damper deformation, the dampers rise in temperature and suffer oxidation and degradation at their outer peripheries which are exposed directly to the air, resulting in breakage.

SUMMARY OF THE INVENTION

In view of the foregoing, it is a first object of the present invention to provide a novel torque transmission member and power transmission device. A second object thereof is to suppress breakage of the torque transmission member.

To achieve the foregoing objects of the present invention, according to a first aspect of the present invention, a power transmission device for transmitting torque of a driving unit to a driven unit has a first rotator (110) to be driven for rotation by the driving unit, a second rotator (130) coupled to the driven unit, and a torque transmission member (140) made of an elastically deformable material for making contact with the first rotator (110) and the second rotator (130) to transmit torque from the first rotator (110) to the second rotator (130). Here, an outer periphery of the torque transmission member (140) includes a contact surface (140b) for making contact with the rotators (110, 130) and a non-contact surface (140a) out of contact with the rotators (110, 130), the non-contact surface (140a) being provided with an oxygen permeance suppression layer (140c) made of a material having an oxygen permeability less than that of the contact surface (140b).

Consequently, it is possible to suppress the permeance of oxygen into the torque transmission member (140) through the oxygen permeance suppression layer (140c). Thus, even when the torque transmission member (140) rises in temperature, the outer periphery thereof exposed directly to the air can be prevented from oxidation and degradation. This can suppress breakage of the torque transmission member (140), and achieve a new power transmission device different from conventional devices.

In a second aspect of the invention, the oxygen permeance suppression layer (140c) is made of acrylic rubber.

In a third aspect of the invention, the oxygen permeance suppression layer (140c) is made of fluorosilicone rubber.

In a fourth aspect of the invention, the oxygen permeance suppression layer (140c) is made of silicone rubber.

In a fifth aspect of the invention, the oxygen permeance suppression layer (140c) is made of fluorine rubber.

In a sixth aspect of the invention, the oxygen permeance suppression layer (140c) is made of polyamide.

In a seventh aspect of the invention, the oxygen permeance suppression layer (140c) is made of polytetrafluoroethylene.

According to an eighth aspect of the present invention, a torque transmission member is made of an elastically deformable material for making contact with a first rotator (110) and a second rotator (130) to transmit torque from the first rotator (110) to the second rotator (130), and has an outer periphery including a contact surface (140b) for making contact with the rotators (110, 130) and a non-contact surface (140a) out of contact with the rotators (110, 130), the non-contact surface (140a) being provided with an oxygen permeance suppression layer (140c) made of material having an oxygen permeability less than that of the contact surface (140b).

Consequently, it is possible to suppress the permeance of oxygen into the torque transmission member (140) through the oxygen permeance suppression layer (140c). Thus, even when the torque transmission member (140) rises in temperature, the outer periphery thereof exposed directly to the air can be prevented from oxidation and degradation. This can suppress breakage of the torque transmission member (140), and achieve a new torque transmission member different from conventional members.

Incidentally, the parenthesized numerals accompanying the foregoing individual means correspond with concrete means seen in the embodiments to be described later. Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein:

FIG. 1A is a cross-sectional view of a power transmission device according to an embodiment of the present invention;

FIG. 1B is a left side view of FIG. 1A;

DETAILED DESCRIPTION OF THE PREFERRED EMBODIMENTS

The following description of the preferred embodiments is merely exemplary in nature and is in no way intended to limit the invention, its application, or uses.

(First Embodiment)

Figure 2:
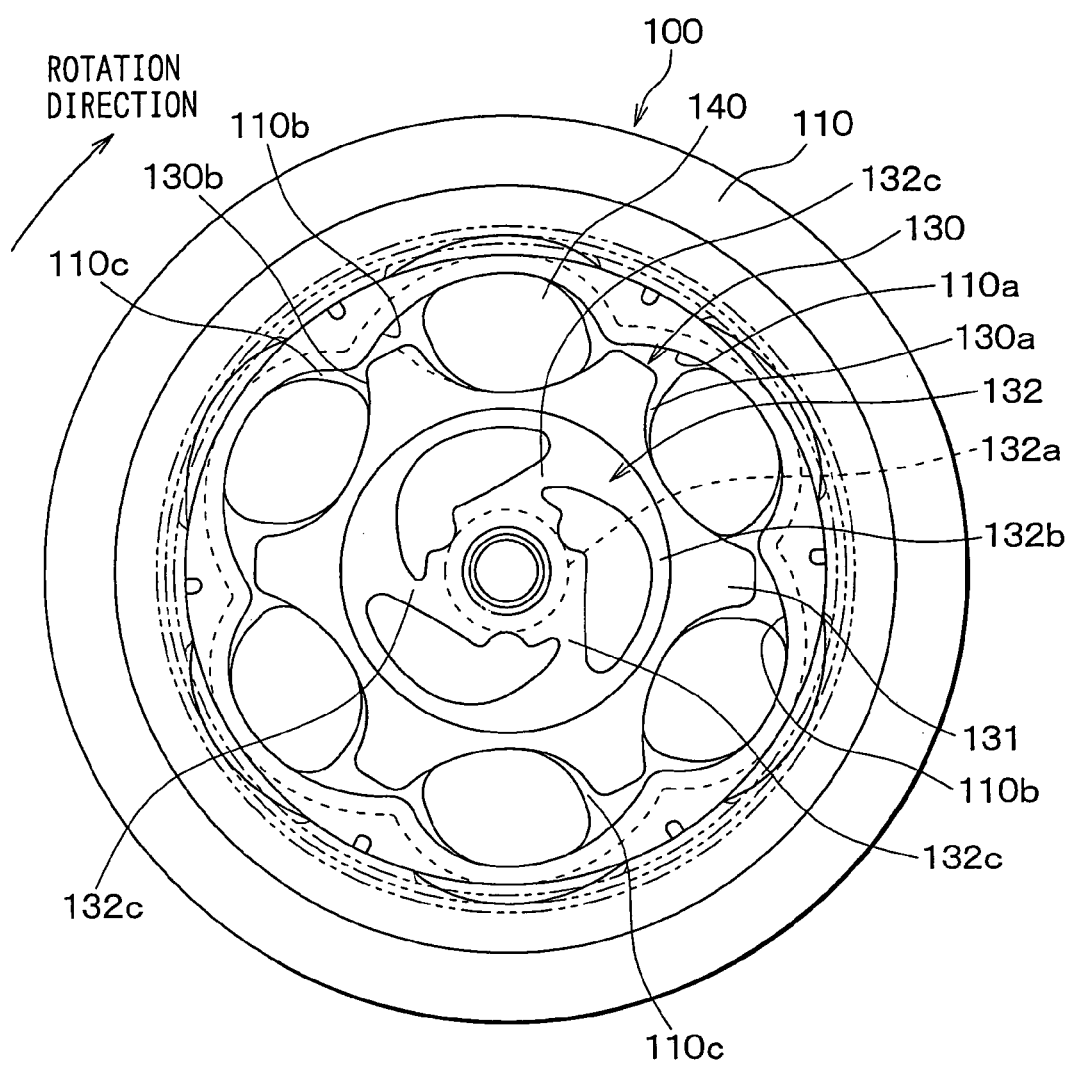
FIG. 2 is a front view of the power transmission device with its cover removed.

The present embodiment is a power transmission device according to the present invention which is applied to a joint for transmitting the power of an engine, a driving unit, to the compressor, a driven unit, of a vehicle air conditioner. FIG. 1A is a cross-sectional view of the joint (power transmission device) 100 according to the present embodiment. FIG. 1B is a left side view of FIG. 1A. FIG. 2 is a front view of the joint 100 with its cover 131a removed.

In FIGS. 1A and 1B, a pulley 110 is a first rotator made of metal or hard resin such as phenolic resin which is formed in a generally cylindrical shape. The first rotator 110 receives a driving force from a drive engine (not shown) through V belts (not shown) for rotation. A pulley hub 111 of cylindrical shape is integrally formed on the inner periphery of this pulley 100. A radial rolling bearing 120 for rotatably supporting the pulley 110 is mounted on the pulley hub 111. Incidentally, the inner ring of the radial rolling bearing 120 is fitted into a front housing of the compressor (not shown).

For the pulley 110, the present embodiment employs a pulley of a poly-drivebelt compatible type, having a plurality of V grooves 112. The pulley 110 is made of resin. Then, a metal sleeve 113 is integrated with the pulley hub 111 by insert molding to the inner periphery of the pulley hub 111 for the bearing 120 to be mounted on.

A center hub 130 is a second rotator which is arranged inside the pulley 110 so as to be coaxial to the pulley 110 for rotation. As shown in FIG. 2, the outer periphery of this center hub 130 is formed into a star shape or a gear shape having a plurality of pits and projections.

Here, the center hub 130 comprises an outer hub 131 and an inner hub 132. The outer hub 131 is made of resin having a hardness higher than that of the dampers 140 that are arranged on the outer periphery of the center hub 130. The inner hub 132 is made of metal, and is integrated with the outer hub 131 by insert molding.

The inner hub 132 comprises a cylindrical portion 132a, an annular portion 132b, and a plurality (in the present embodiment, three) of bridge portions 132c. The cylindrical portion 132a is a cylindrically-formed coupling part for establishing a spline connection with a shaft of the compressor. The annular portion 132b is a rotating part integrated with the outer hub 131. The bridge portions 132c mechanically couple the annular portion 132b and the cylindrical portion 132a so that torque is transmitted from the annular portion 132b to the cylindrical portion 132a. The bridge portions 132c are also given such strength that they break down when the torque to be transmitted from the annular portion 132b to the cylindrical portion 132a reaches or exceeds a predetermined value.

Figure 3:
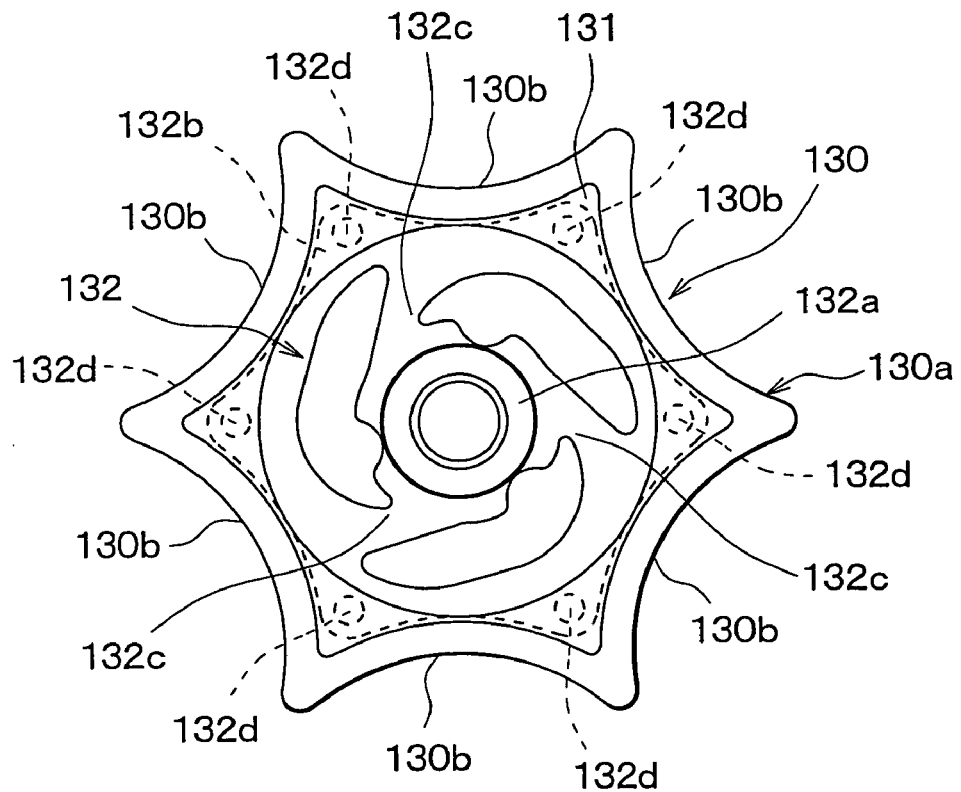
FIG. 3 is a front view of a center hub according to the embodiment of the present invention.

As shown in FIG. 3, the area of the annular portion 132b for the outer hub 131 to be arranged on is provided with a mechanical engaging means such as a plurality of holed portions 132d protruding from the annular portion 132b, with a gear-shaped or star-shaped outer periphery. As a result, the inner hub 132 and the outer hub 131 are mechanically engaged with each other to enhance the coupling force between the inner hub 130 and the dampers 140.

Now, the pulley 110 has an inner periphery 110a which faces the star-shaped outer periphery 130a of the outer hub 131. As shown in FIG. 2, the inner periphery 110a is curved in a wavy pattern to provide projections and depressions opposite to those of the star-shaped outer periphery 130a of the center hub 130.

Specifically, the star-shaped outer periphery 130a of the center hub 130 (hereinafter, referred to as hub outer periphery 130a) and the inner periphery 110a of the pulley 110 (hereinafter, referred to as pulley inner periphery 110a) are arranged opposite each other at a predetermined distance in the radial direction, i.e., in the direction orthogonal to the rotation axis. In addition, the pulley inner periphery 110a has a plurality of concave portions 110b sinking away from the hub outer periphery 130a, or toward the outside, around the rotation axis to form a wavy shape. Meanwhile, the hub outer periphery 130a has a plurality of concave portions 130b sinking away from the pulley inner periphery 110a, or toward the center, around the rotation axis to form a star shape.

Then, the spaces between the concave portions 110b and 130b opposed to each other (hereinafter, these spaces will be referred to as damper accommodating portions 110c) are provided with the dampers 140. The dampers 140 are made of an elastic material capable of elastic deformation, for making contact with the pulley inner periphery 110a and the hub outer periphery 130a to transmit torque from the pulley 110 to the center hub 130. These dampers 140, again, are also known as torque transmission members.

Figure 4:
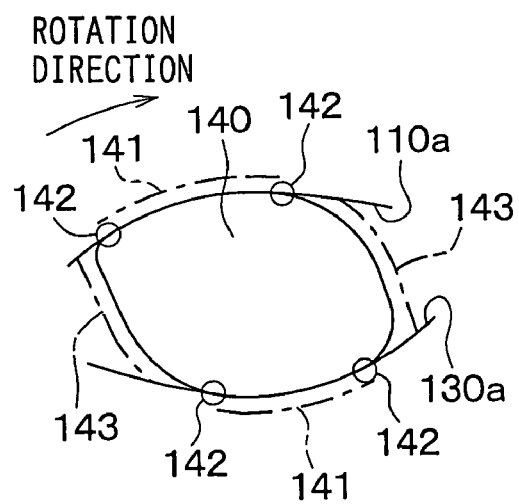
FIG. 4 is a front view of a damper according to the embodiment of the present invention.
Figure 5A:
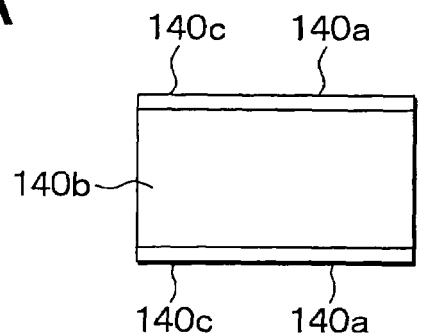
FIG. 5A is a top side explanatory view of FIG. 5C showing the damper according to the embodiment of the present invention.
Figure 5B:
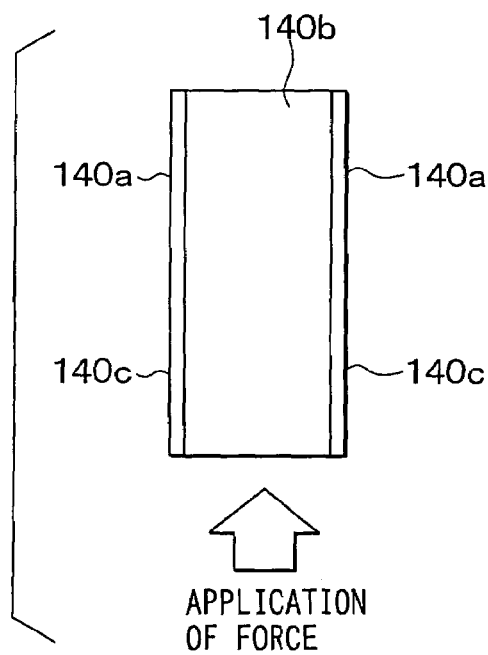
FIG. 5B is a left side explanatory view of FIG. 5C showing the damper according to the embodiment of the present invention.
Figure 5C:
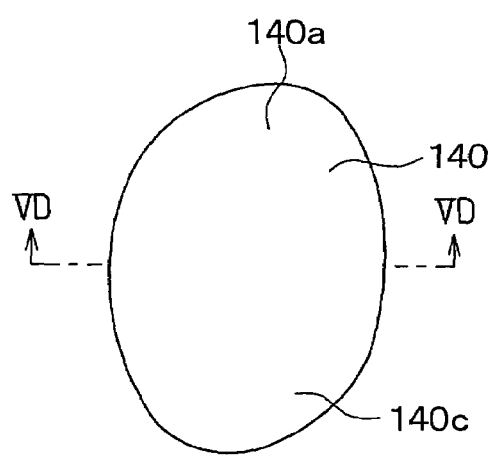
FIG. 5C is an explanatory diagram showing the damper according to the embodiment of the present invention.
Figure 5D:
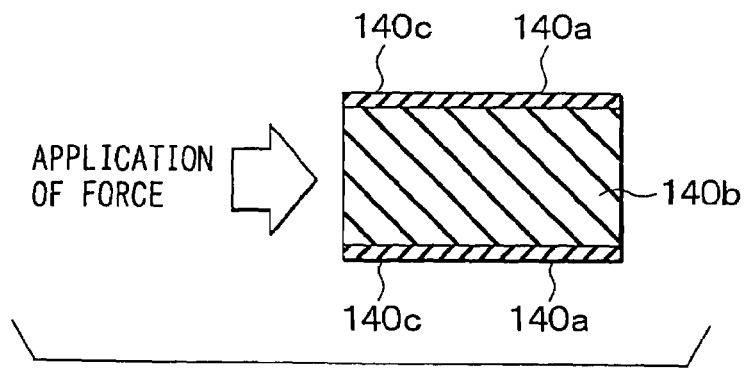
FIG. 5D is an explanatory diagram showing the damper according to the embodiment of the present invention.

As shown in FIG. 4, the outer periphery of each damper 140 includes contact surfaces 141 with the pulley inner periphery 110a and the hub outer periphery 130a. Ends 142 of the contact surfaces 141 are linked with areas 143 of a generally linear shape. The ends 142 are curved to shape the dampers 140 into a generally elliptical shape.

As shown in FIGS. 5A to 5D, the outer periphery of each damper 140 also includes non-contact surfaces 140a which are out of contact with the pulley inner periphery 110a and the hub outer periphery 130a. The non-contact surfaces 140a are provided with oxygen permeance suppression layers 140c. The oxygen permeance suppression layers 140c are made of a material having an oxygen permeability less than that of the contact surfaces 140b which are in contact with the pulley inner periphery 110a and the hub outer periphery 130a.

In the present embodiment, the oxygen permeance suppression layers 140c are made of acrylic rubber. The contact surfaces 140b and the portions inside the oxygen permeance suppression layers 140c are made of EPDM (ethylene-propylene-diene terpolymer rubber). The oxygen permeance suppression layers 140c and the EPDM layer inside are integrated with each other.

Incidentally, as shown in FIG. 1, the outer hub 131 has a cover 131a for constraining the dampers 140 from making displacement beyond a predetermined dimension toward an end in the direction of the rotation axis (left in the diagram). The cover 131a is locked and fixed to inside the pulley 110 by means of its locking protrusions 131b which are capable of elastic deformation. As for the other end in the direction of the rotation axis (right in the diagram), the dampers 140 are constrained from displacement beyond a predetermined dimension, by means of protrusions 110c of the pulley 110 which protrude toward the dampers 140.

Now, description will be given of the general operation of the joint 100 according to the present embodiment. When the pulley 110 undergoes torque, the pulley 110 and the center hub 130 make relative displacement to reduce the volumes of the damper accommodating portions 110c. The dampers 140 accommodated in the damper accommodating portions 110c thus make compression deformation and shear deformation.

Among the deformations of the dampers 140, or the compression deformation and shear deformation thereof, deformation components in the direction of rotation cause reactive force for transmitting the torque from the pulley 110 to the center hub 130. Meanwhile, the deformations of the dampers 140 absorb torque variations.

Here, when the torque to be transmitted from the pulley 110 to the center hub 130 reaches or exceeds a predetermined value, the bridge portions 132c break down to interrupt the torque transmission from the pulley 110 to the center hub 130. That is, the inner hub 132 functions as a torque limiter mechanism for preventing torque transmission beyond a predetermined value.

Next, description will be given of the operation and effect of the present embodiment. According to the present embodiment, the air-exposed non-contact surfaces 140a of the dampers 140 are provided with the oxygen permeance suppression layers 140c, so that it is possible to suppress the permeance of oxygen into the dampers 140 through the oxygen permeance suppression layers 140c. Thus, even when the dampers 140 rise in temperature, the outer peripheries thereof exposed directly to the air can be prevented from oxidation and degradation. This can suppress any breakage of the dampers 140.

Figure 6:
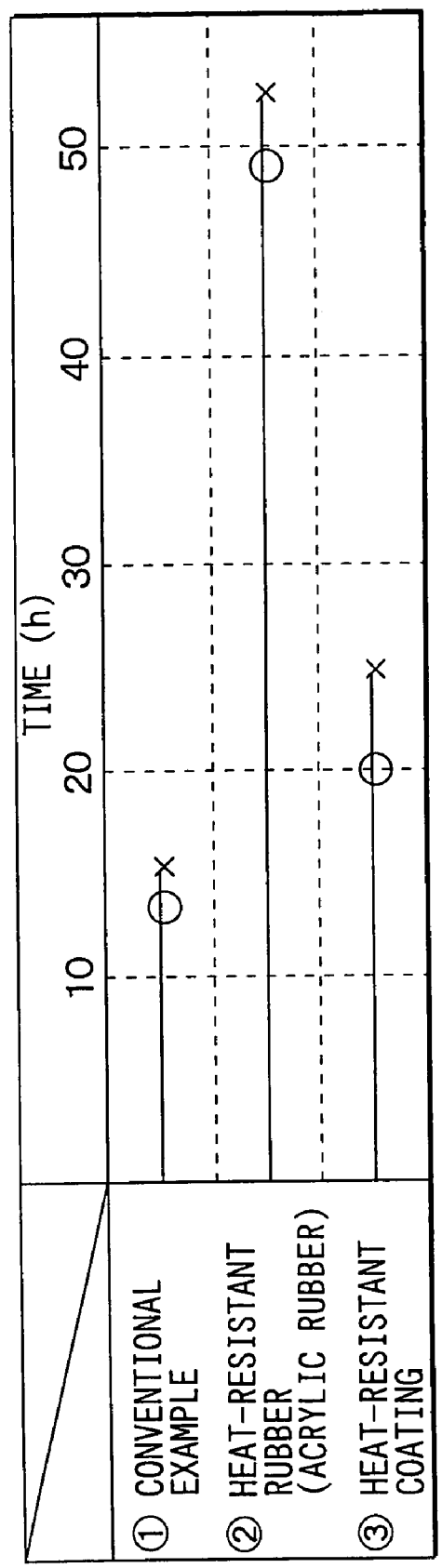
FIG. 6 is a graph showing the result of an endurance test on dampers according to the embodiment of the present invention.

FIG. 6 shows a test result showing the time to elapse before dampers 140 break down when the dampers 140 are repeatedly subjected to maximum possible loads in actual vehicles. As is evident from this test result, the dampers (2) and (3) provided with an oxygen permeance suppression layer 140c exhibit longer life than that of the intact article (1) having no oxygen permeance suppression layer 140c.

(Other Embodiments)

In the foregoing embodiment, the oxygen permeance suppression layers 140c are made of acrylic rubber. However, the present invention is not limited thereto. For example, the oxygen permeance suppression layers 140c may be made of fluorosilicone rubber, silicone rubber, fluorine rubber, polyamide, polytetrafluoroethylene, and so on.

In the foregoing embodiment, the dampers 140 are given a generally elliptical shape. However, the present invention is not limited thereto. Other shapes including a cylindrical shape are also applicable.

In the foregoing embodiment, the joint according to the present invention is applied to a vehicle air conditioner. Nevertheless, the present invention is not limited thereto, but may also be applied to other applications such as a stationary air conditioner.

In the foregoing embodiment, the portions inside the oxygen permeance suppression layers 140c are made of rubber (EPDM). Nevertheless, the present invention is not limited thereto, but may use other resin materials such as an elastomer.

In the foregoing embodiment, the center hub 130, the second rotator to be connected to a driven unit, is arranged inside the pulley 110, the first rotator to be driven for rotation by the driving source. Nevertheless, the first rotator may inversely be arranged inside the second rotator. The cover 131a and the protrusions 110c may be omitted. Moreover, the joint 100 is not limited to the foregoing embodiment in configuration, but may be applied to other power transmitting means such as a flexible coupling and an electromagnetic clutch.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A power transmission device for transmitting torque of a driving unit to a driven unit, comprising:
    a first rotator to be driven for rotation by said driving unit;
    a second rotator coupled to said driven unit; and
    at least one torque transmission member made of an elastically deformable material for making contact with said first rotator and said second rotator to transmit torque from said first rotator to said second rotator, wherein
    an outer periphery of said torque transmission member includes a contact surface for making contact with said rotators and a non-contact surface out of contact with said rotators, said non-contact surface being provided with an oxygen permeance suppression layer made of a rubber having an oxygen permeability less than an oxygen permeability of said contact surface, and
    when the first rotator rotates, stress causes the torque transmission member to deform.

2. The power transmission device according to claim 1, wherein said oxygen permeance suppression layer is made of acrylic rubber.

3. The power transmission device according to claim 1, wherein said oxygen permeance suppression layer is made of fluorosilicone rubber.

4. The power transmission device according to claim 1, wherein said oxygen permeance suppression layer is made of silicone rubber.

5. The power transmission device according to claim 1, wherein said oxygen permeance suppression layer is made of fluorine rubber.

6. The power transmission device according to claim 1, wherein said oxygen permeance suppression layer is made of polyamide.

7. The power transmission device according to claim 1, wherein said oxygen permeance suppression layer is made of polytetrafluoroethylene.

8. The power transmission device according to claim 1, wherein the torque transmission member is one of a plurality of torque transmission members intermittingly space in a circumferential direction.

9. A torque transmission member made of an elastically deformable material for making contact with a first rotator and a second rotator to transmit torque from said first rotator to said second rotator, said torque transmission member comprising:
    an outer periphery including a contact surface for making contact with said rotators; and
    a non-contact surface out of contact with said rotators, said non-contact surface having an oxygen permeance suppression layer made of a rubber having an oxygen permeability less than an oxygen permeability of said contact surface, wherein
    when said first rotator rotates, stress causes the torque transmission member to deform.

* * * * *